United States Patent
Aggarwal et al.

(10) Patent No.: US 10,970,595 B2
(45) Date of Patent: Apr. 6, 2021

(54) METHODS AND SYSTEMS FOR DOCUMENT CLASSIFICATION USING MACHINE LEARNING

(71) Applicant: NETAPP, INC., Sunnyvale, CA (US)

(72) Inventors: Deepti Aggarwal, New Delhi (IN); Jayanta Basak, Bangalore (IN); Siddhartha Nandi, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 255 days.

(21) Appl. No.: 16/281,501

(22) Filed: Feb. 21, 2019

(65) Prior Publication Data

US 2019/0392250 A1    Dec. 26, 2019

Related U.S. Application Data

(60) Provisional application No. 62/687,414, filed on Jun. 20, 2018, provisional application No. 62/693,016, filed on Jul. 2, 2018.

(51) Int. Cl.
| | |
|---|---|
| *G06F 7/02* | (2006.01) |
| *G06F 16/00* | (2019.01) |
| *G06K 9/62* | (2006.01) |
| *G06F 16/38* | (2019.01) |
| *G06N 20/00* | (2019.01) |

(Continued)

(52) U.S. Cl.
CPC .......... *G06K 9/6215* (2013.01); *G06F 16/38* (2019.01); *G06F 16/93* (2019.01); *G06F 40/284* (2020.01); *G06K 9/6228* (2013.01); *G06N 20/00* (2019.01)

(58) Field of Classification Search
CPC .... G06K 9/6215; G06K 9/6228; G06F 16/38; G06F 16/93; G06F 40/284; G06N 20/00
See application file for complete search history.

(56) References Cited

U.S. PATENT DOCUMENTS

| | | |
|---|---|---|
| 9,177,262 B2 | 11/2015 | Lightner et al. |
| 2012/0296637 A1 | 11/2012 | Smiley et al. |

(Continued)

OTHER PUBLICATIONS

Bíró, István; "Document Classification with Latent Dirichlet Allocation"; Eötvös Loránd University; Budapest; Jun. 30, 2009; http://www.tnkcs.inf.elte.hu.

(Continued)

*Primary Examiner* — Bruce M Moser
(74) *Attorney, Agent, or Firm* — Klein, O'Neill & Singh, LLP

(57) ABSTRACT

Methods and systems for document classification are provided. One method includes generating by a processor, a plurality of topics using content of a plurality of electronic documents, where each topic includes a plurality of words associated with the plurality of electronic documents; reducing by the processor, the plurality of topics to a subset of topics to represent the plurality of electronic documents based on a parameter indicating a property of each subset topic and separation between the subset topics; automatically generating by the processor, a tag for each subset topic, based on the tag's position within the subset topic; wherein each tag is an attribute of each subset topic; storing by the processor, the subset of topics with corresponding tags in a model data structure; and updating the model data structure by the processor based on one of a new topic and a new tag associated with an electronic document.

20 Claims, 13 Drawing Sheets

(51) Int. Cl.
*G06F 16/93* (2019.01)
*G06F 40/284* (2020.01)

(56) References Cited

U.S. PATENT DOCUMENTS

| | | | | |
|---|---|---|---|---|
| 2014/0074886 | A1* | 3/2014 | Medelyan | G06F 16/2455 707/777 |
| 2014/0214835 | A1 | 7/2014 | Oehrle et al. | |
| 2016/0012019 | A1* | 1/2016 | Bagwell | G06F 16/35 707/738 |
| 2017/0270096 | A1* | 9/2017 | Sheafer | G06F 40/295 |
| 2018/0032600 | A1 | 2/2018 | English et al. | |

OTHER PUBLICATIONS

Amazon EC2; from the Internet; printed on Jan. 26, 2021; 5 pages; https://aws.amazon.com/ec2/?sc_channel=PS&sc_campaign=acquisition_IN&sc_publisher=google&sc_medium=ec2_b&sc_content=ec2_e&sc_detail=amazon%20ec2&sc_category=ec2&sc_segment=177536393453&sc_matchtype=e&sc_country=IN&s_kwcid=AL!4422?3!177536393453!e!!g!!amazon%20ec2&ef_id=WsdGxAAABRLwIGUg:20180414155255:s.

Amazon Simple Notification Service; from the internet; printed on Jan. 26, 2021; 5 pages; https://aws.amazon.com/sns/?sc_channel=PS&sc_campaign=acquisition_IN&sc_publisher=google&sc_medium=sns_b&sc_content=sns_e&sc_detail=amazon%20sns&sc_category=sns&sc_segment=225239944074&sc_matchtype=e&sc_country=IN&s_kwcid=AL!4422!3!225239944074!e!!g!!amazon%20sns&ef_id=WsdGxAAABRLwIGUg:20180414155237:s.

Amazon S3; from the internet; printed on Jan. 26, 2021; 6 pages; https://aws.amazon.com/s3/?sc_channel=PS&sc_campaign=acquisition_IN&sc_publisher=google&sc_medium=s3_b&sc_content=s3_e&sc_detail=amazon%20s3&sc_category=s3&sc_segment=177536627426&sc_matchtype=e&sc_country=IN&s_kwcid=AL!4422!3!177536627426!e!!g!!amazon%20s3&ef_id=WsdGxAAABRLwIGUg:20180414155215:s.

ElasticSearch; from the Internet; printed on Jan. 26, 2021; 4 pages; https:www.elastic.co/products/elasticsearch.

Teh et al.; "Hierarchical Dirichlet Processes"; Nov. 15, 2005; 30 pages; https:people.eecs.berkeley.edu/~jordan/papers/hdp.pdf.

Reinsel et al.; "DataAge 2025: The Digitization of the World form Edge to Core"; Nov. 2018; IDC Analyze the Future; 28 pages; https://www.seagate.com/files/www-content/our-story/trends/files/Seagate-WP-DataAge2025-March-2017.pdf.

Kibana; from the Internet; printed on Jan. 26, 2021; 4 pages; https://elastic.co/products/kibana.

Blei et al.; "Latent Dirichlet Allocation"; Journal of Machine Learning Research 3; 2003;30 pages; http://www.jmlr.org/papers/volume3/blei03a/blei03a.pdf.

Mallet; from the Internet; printed on Jan. 26, 2021; 1 page; http://mallet.cs.umass.edu.

Bhattacharyya, Pushpak; "Resnick's measures of word Similarity"; Speech, NLP and the Web/Topics inAI Programming; CSE Dept., IIT Bombay; 1997; 23 pages; https://www.cse.iitb.ac.in/~cs626-449/slides/Lec%209.ppt.

Identity and access management in Amazon S3; from the Internet; printed on Jan. 26, 2021; 1 page; https://docs.aws.amazon.com/AmazonS3/latest/dev/s3-access-control.html.

Object Tagging; from the Internet; printed on Jan. 26, 2021; 3 pages; https://docs.aws.amazon.com/AmazonS3/latest/dev/object-tagging.html.

Topic Model; Wikipedia; from the Internet; printed on Jan. 26, 2021; 2 pages; https://en.wikipedia.org/wiki/Topic_model.

WordNet; Princeton University; from the internet; printed on Jan. 26, 2021; 2 pages; https://wordnet.princeton.edu.

Pedersen et al.; "WordNet: Similarity—Measuring the Relatedness of Concepts"; American Association for Artificial Intelligence; 2004; 2 pages; http://www.d.umn.edu/~tpederse/Pubs/AAAI04PedersenT.pdf.

Pedersen, Ted; WordNetSimilarity; from the Internet; printed on Jan. 26, 2021; 1 page; http://wn-similarity.sourceforge.net.

The Compliance Insider; from the Internet; printed on Jan. 26, 2021; 3 pages; https://www.healthcarecompliancepros.com/news-events.

Zeng, Jia; "A Topic Modelling Toolkit Using Belief Propagation" Journal of Machine Learning Research 13; 2012; 4 pages.

Stanford Topic Modeling Toolbox; from the Internet; printed on Jan. 26, 2021; 5 pages; http://nlp.stanford.edu/software/tmt/tmt-0.4/.

Gensim: Topic Modelling for Humans; from the Internet; printed on Jan. 26, 2021; 3 pages; http://radimrehurek.com/gensim/.

Amazon Macie; from the internet; printed on Jan. 26, 2021; 3 pages; https://aws.amazon.com/macie/.

Zhao et al.; "MetaLDA: a Topic Model that Efficiently Incorporates Meta Information"; Faculty of Information Technology, Monash University, Melbourne VIC, Australia; 2017; 10 pages.

Zhao et al.; "ZenLDA: An Efficient and Scalable Topic Model Training System on Distributed Data-Parallel Platform"; 2015; 11 pages.

Fast and Scalable Topic-Modelling; from the internet; printed on Jan. 26, 2021; 1 page; https://www.ics.uci.edu/~asuncion/software/fast.htm.

Das et al.; "Gaussian LDA for Topic Models with Word Embeddings"; Association for Computational Linguistics; Jul. 2015; pp. 795-804.

Nguyen et al.; "Improving Topic Models with Latent Feature Word Representations"; Association for Computational Linguistics; 2015; pp. 299-313.

Elango et al.; "Clustering Images Using Latent Dirichlet Allocation Model"; University of Wisconsin, Madison; Dec. 2005; 18 pages.

Word2Vec—Wikipedia; from the internet; printed on Jan. 26, 2021; 3 pages; https://en.wikipedia.org/wiki/Word2vec.

Twitter Usage Statistics; from the internet; printed on Jan. 26, 2021; 3 pages; http://www.internetlivestats.com/twitter-statistics/.

* cited by examiner

METHODS AND SYSTEMS FOR DOCUMENT CLASSIFICATION USING MACHINE LEARNING

CROSS-REFERENCE TO RELATED APPLICATIONS

This patent application claims priority to U.S. Provisional Application Ser. No. 62/687,414, filed on Jun. 20, 2018, entitled "Methods and Systems for Document Classification Using Machine Learning" and U.S. Provisional Application Ser. No. 62/693,016, filed on Jul. 2, 2018, entitled "AutoCritic: Content based Document Classification", the disclosure of both the applications is incorporated herein by reference in their entirety.

TECHNICAL FIELD

The present disclosure relates to electronic documents, and particularly, to computing technology for automatic, document classification using machine learning.

BACKGROUND

Electronic documents continue to be produced extensively by various organizations. IDC (International Data Corporation) estimates that by 2025 worldwide data will be about 163 ZB (Zetabytes), where 1 ZB is equal to 1,000,000,000,000,000,000,000 bytes)). A large portion of this data would be unstructured, dominated primarily by text. The large number of new web pages mined by Google (without derogation of any third party trademark rights), or the 6000 tweets posted per second, as well as the growing electronic email archives and file services contribute to the growth of unstructured data generation. This increase in data volume presents challenges for enterprises to store, manage and utilize data. The challenge is predominant for unstructured data because very little is "known" about the data.

Electronic data/documents are processed by various organizations using different governance policies and procedures. It is desirable to develop computing technology for an automated document classification system that can tag a specific document such that a document can processed by one or more computing systems. Continuous efforts are being made to develop machine learning systems for classifying documents.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
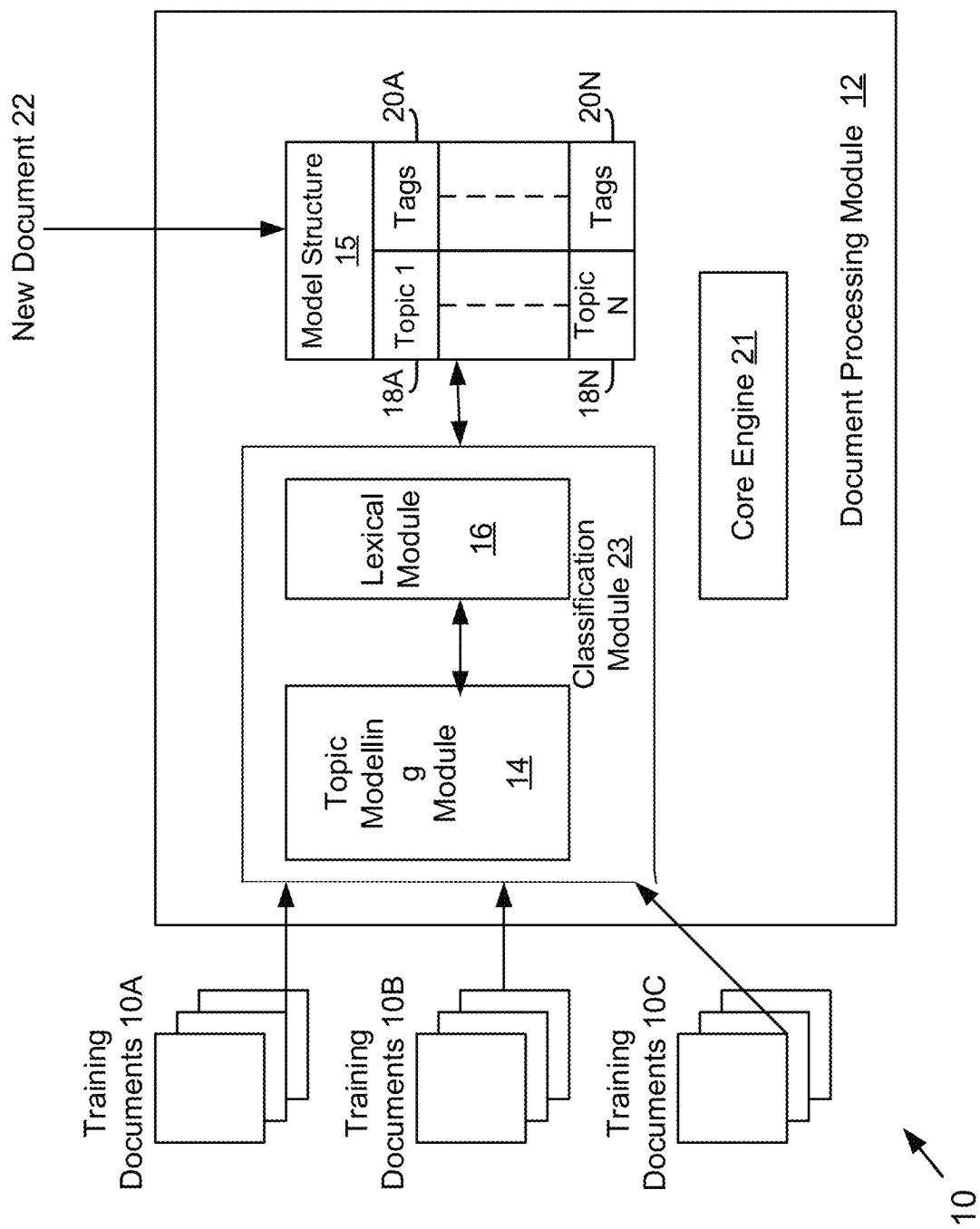
FIG. 1A shows an example of a document processing module, according to one aspect of the present disclosure.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, unstructured data is stored by various organizations in computing systems. Governance policy for handling the data can be facilitated by using "intelligent" metadata. This generates a demand for automated data cataloging over which governance related services can be built.

Governance policy decisions, i.e. how to handle certain documents and data are more effective, if the knowledge and content of the data/document is incorporated into policy making. Thus, a content-based tag for individual documents can be used as metadata that can be used for developing governance polices.

Automating the process for generating tags can be challenging for the current state of the art in Natural Language Processing (NLP). For example, NLP processing does not efficiently discover an optimal number of well-defined tags/topics without manual intervention, automatic annotation of a tag as being a "good" tag is a challenge and then using domain specific knowledge for the tags can be expensive because a tag in one environment may not be useful in another.

In one aspect, computing technology is provided for automated document classification and tagging mechanisms. A viewing dashboard may be generated for user documents with content based classification. Tags for different documents are generated automatically and can be used to develop governance policies.

In one aspect, a machine learning technology, for example, Latent Dirchlet Allocation (LDA) can be used to find a cluster of words from different documents. The cluster of words are referred to herein as "topics". As described below in detail, the technology uses existing ontology and a "goodness measure to optimize the number of topics and annotate the documents with tags.

Document Processing Module 12: FIG. 1A shows an example of a system 10 with a document processing module 12 (may be referred to as module 12) with a classification module 23 (may be referred to as module 23), according to one aspect of the present disclosure. Module 23 includes a topic modelling module 14 (may be referred to as module 14), and a lexical module 16 (may be referred to as module 16). Module 12 also includes a core engine 21 that coordinates various operations of modules 14 and 16, respectively. A machine learned, model structure (or model data structure) 15 is generated by module 23, as described below.

Training electronic documents 10A-10C are provided to module 12 and processed using module 14 and module 16, as described below in detail. The model structure 15 is generated using the content of the training documents. The model structure 15 stores a plurality of topics 18A-18N derived from the content of training documents 10A-10C. Each topic is associated with one or more tags 20A-20N that provide an attribute of each topic. The processes for generating the topics and the tags are described below in detail.

When a new document 22 is generated, it is tagged using the model structure 15. The new tag is also used to update the model structure 15, using machine learning.

Figure 1B:
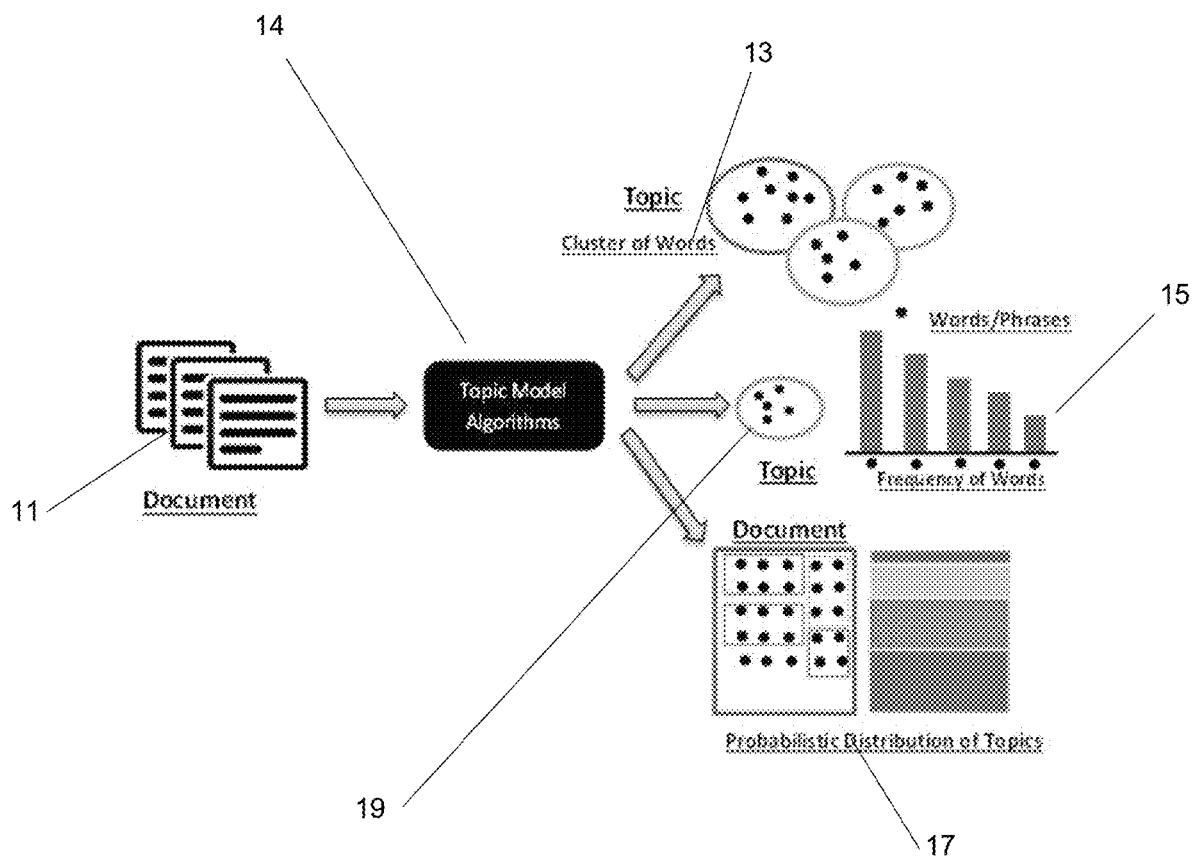
FIG. 1B shows an illustration of topic modelling used by the document processing module, according to one aspect of the present disclosure.

FIG. 1B shows an example of topic modelling for a plurality of documents 11. In NLP, topic models are used to identify hidden semantic structures in a body of text. A topic model is a statistical model, aimed at discovering abstract themes. LDA is a generative Statistical model that allows sets of observations to be explained by unobserved groups that explain why some parts of data may be similar. LDA provides an algorithm for topic modelling that is based on an assumption that each document is a probabilistic distribution over a set of topics, and each topic is a probabilistic distribution over a set of words. LDA captures this assumption in a mathematical framework that allows examining a set of documents and discovering based on statistics, what the topics may be and the balance of each document's "topics". LDA takes a document corpus as input and provides a set of topics, a probabilistic distribution of each topic over a set of words and topic-wise distribution of each document.

Referring back to FIG. 1B, the topic model algorithm 14 is executed by a processor and generates various topics that can be represented spatially as a cluster of semantically similar words 13. A topic 19 is selected from the cluster of words based on a probabilistic distribution of topics 17. The frequency of words that are used in the document are shown as 15. In one aspect, a document may be viewed as a distribution over topics, while the topic may be viewed as distribution over words.

Conventional LDA techniques have shortcomings. For example, LDA uses an input for a "number of topics" that are present in a document corpus. An end-user of the documents may not be aware of the number of topics. LDA also produces a "bag of words" as an output for representing each topic. However, to classify and tag documents, there is a need for a "representative" word or "tag" for each bag of words. The tag should provide a lexical or semantic representation of the topic (or theme). Furthermore, conventional techniques are not accurate for documents that are limited in size. Conventional techniques also fail to provide adequate number of topics for a document corpus. The present disclosure provides a better solution to document classification, as described below in detail.

Figure 1C:
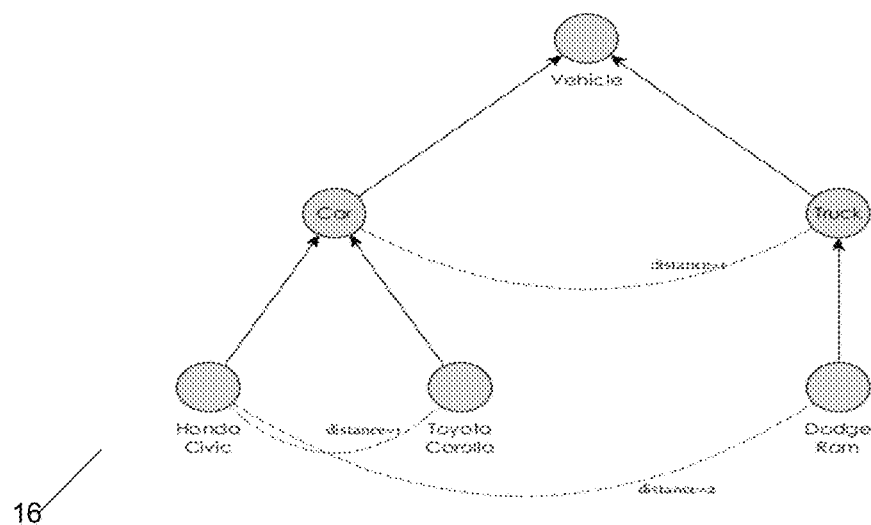
FIG. 1C shows an illustration of a lexical module, used according to one aspect of the present disclosure.

FIG. 1C shows an example of a lexical module (database) 16. One example of such a database is called "WORDNET" provided by Princeton University. The lexical module 16 provides synonyms sets ("synsets") and semantic relations. Synsets are interlinked by conceptual semantics and lexical relationships. A word might belong to different synsets, based on what the word may mean and can be represented with more than one "sense". A relatedness score may also be used to illustrate the similarity between two concepts/words. This may be derived by using a "Resnick" measure that provides content based relatedness score that is based on an amount of information shared between related words.

The example of FIG. 1C shows a hierarchical relationships between a vehicle and vehicle type as nodes. FIG. 1C also illustrates the distance between the various nodes that can be used to determine relatedness. For example, the distance between a car and truck is greater than the distance between a "Honda Civic" and a "Toyota Corolla" (without derogation of any third party trademark rights), indicating a closer relationship between the two cars than between the car and the truck.

In one aspect, module 14 is configured to execute the LDA algorithm on a group words (unigrams) and then assign each group to a topic. A document corpus is used to identify topics and when a new document is generated, the model structure 15 is used to identify potential topics. New topics may be discovered by executing LDA on a regular interval on the document corpus of an enterprise. This updates the model structure 15 using machine learning.

In one aspect, for the systems and processes of the present disclosure, once topics are determined by module 14, existing ontology is used (implemented by module 16) to determine the distance between words within each topic and the distance between different topics. The system formulates a measure (e.g. the Resnick measure) to represent compactness of each topic and how far the topics may be separated to determine an optimum number of topics.

In one aspect, module 14 executes LDA with varying number of topics (e.g. a range "n" defined by a minimum, $n_{min}$ and maximum, $n_{max}$). The maximum value of N may be determined by the size of a document corpus and the type of documents. This defines a range of expected topics and generates a group of words or a cluster of words that are equal to the number of topics. A cluster is considered "good" if it has a low average intra-cluster distance and a high inter-cluster distance, i.e. the clusters are compact and well separated from each other.

In one aspect, r(p, q) is defined as a similarity score between the two words, p and q. In the case of multiple senses of a word, the maximum score across different senses is used. The closer the two words are semantically, higher is the similarity score and conversely, if visualized in space, lower would be the distance separating the two words. Hence, the distance between two words p and q is defined as d(p, q), where $$d(p,q)=1/r(p,q) \quad \text{(i)}$$

Module 23 runs the LDA with the number of topics 'n' ranging from $n_{min}$ to $n_{max}$. For each n, module 23 defines two distance measure, inter-cluster and intra-cluster distance.

Intra-cluster distance, $D_{ni}$ for topic i where i lies in range (1, n) and n lies in range ($n_{min}$, $n_{max}$) is defined as:

$$D_{ni}=\max(d(w_{ip},w_{iq})) \quad \text{(ii)}$$

where, $w_{ip}$ and $w_{iq}$ represent all word pairs belonging to topic 'i' for a given n.

Inter-cluster distance, $D_{ni, nj}$ between two topics 'i' and 'j' for a given n in range ($n_{min}$, $n_{max}$):

$$D_{ni,nj}=\text{avg}(d(w_{ip},w_{jq})) \quad \text{(iii)}$$

where, $w_{ip}$ represents a set of all words belonging to topic 'i' and $w_{jq}$ represents set of all words belonging to topic 'j' for the given number of topics.

A 'goodness' score, $S_n$ (determined by module 16, FIG. 1C) for a given corpus for a given number of topics, n is defined as:

$$S_n=(n-1)\Sigma_{\text{for each topic } i}D_{ni}/\Sigma_{\text{for each pair of topics } i,j}D_{ni,nj}$$

The foregoing is a ratio of a sum of the intra-cluster distances to a sum of the inter-cluster distances with a normalization factor of (n−1). A low sum of intra-cluster distances implies compact topics containing very similar meaning words while a high sum of inter-cluster distance implies the topics are well separated and distinct from each other. Hence, lower the 'goodness' score, better is the topic model.

An optimum number of topics, $n_{opt}$ are selected based on:

$$n_{opt}=n \text{ for which } S_{nopt}=\min_{\text{for all n in range}}S_n$$

That is, the optimum number of topics is equal to that value of n in the range ($n_{min}$, $n_{max}$) for which $S_n$ is minimum.

For each word $w_{ip}$ in topic i, a 'centricity score', CS, is determined which represents the relative lexical closeness of the word to other words within topic. CS is based on:

$$CS(w_{ip})=\text{avg}(d(w_{ip},w_{iq})) \text{ for all words } w_{iq} \text{ in topic 'i'}$$

A high CS score for a given word denotes the closesness of the word to a cluster centroid. The word $w_{ip}$ which has the highest $CS(w_{ip})$ is chosen as the tag or the representative word for the topic 'i'. Each topic is automatically tagged using module 16. This is shown as 18A/18N and 20A/20N in FIG. 1A, where the tag is an attribute of the topic.

In one aspect, computing technology is provided to generate an optimum number of topics for a document corpus and then automatically annotating the topics. The various aspects disclosed herein can be customized for different enterprises. For example, a hospital management system can use hospital specific vocabulary while a financial institution can use vocabulary specific to the finance industry. It is noteworthy that the adaptive aspects of the present disclosure are not limited to using Wordnet or the Resnick similarity methodology.

Figure 1D:
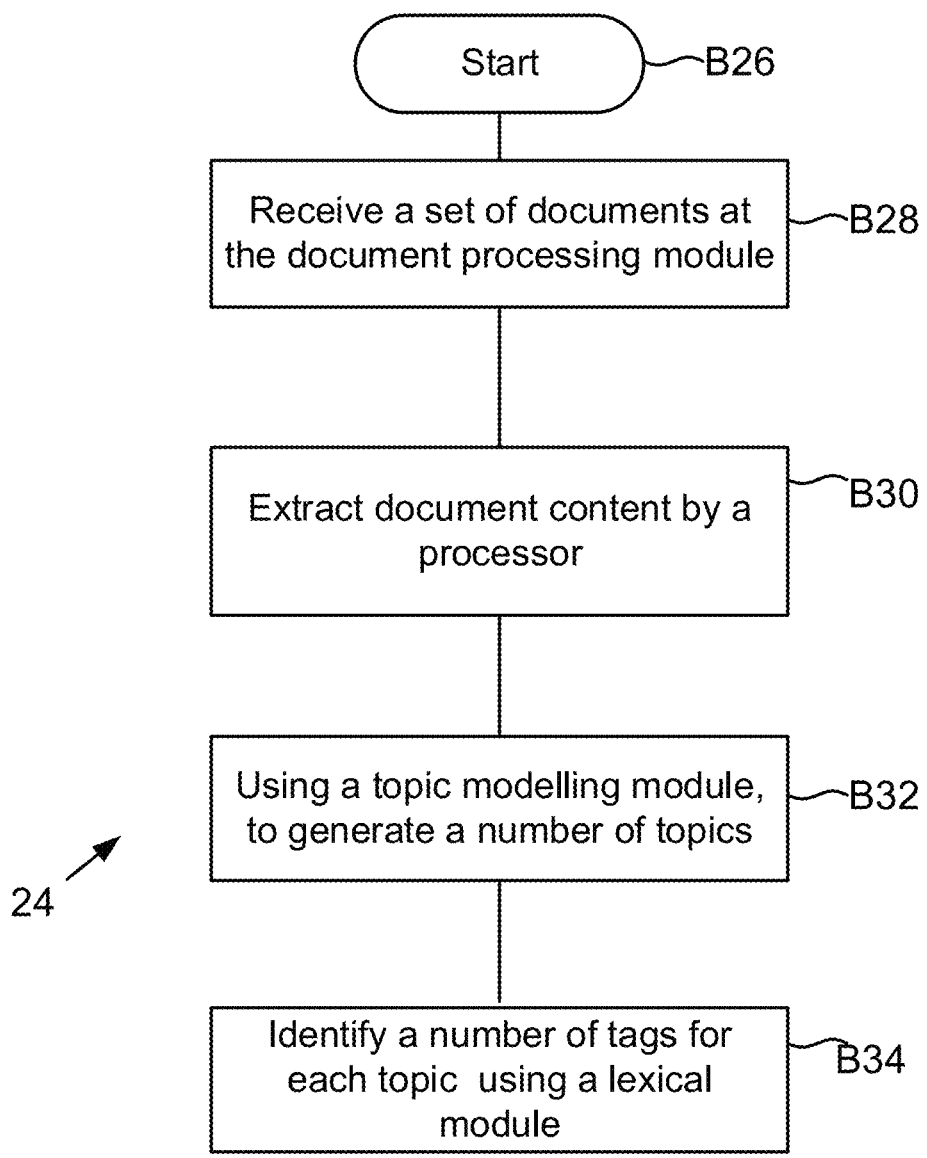
FIG. 1D shows a document classification process, according to one aspect of the present disclosure.

Process Flows: FIG. 1D shows a process 24 for identifying topics and generating tags for a document corpus, according to one aspect of the present disclosure. Process 24 blocks are executed by a processor using the various components of module 12 described above. Process 24 starts in block B26, when electronic documents 10A-10C for a document corpus have been generated by one or more processor executable applications. Module 12 receives the documents in block B28. The document content is extracted in block B30.

In block B32, module 14 generates a list of topics using, for example, the LDA algorithm. The LDA algorithm may be the Mallet LDA algorithm. It is noteworthy that the adaptive aspects of the present disclosure are not limited to any specific LDA algorithm. In one aspect, a number of desired topics are provided to module 14. Module 14 executes the LDA algorithm with input from module 16 to determine an optimum number of topics with a threshold score that represents the overall relevance i.e. "goodness" of the topic as described above. Process block B32 may be executed in a loop until a certain number of topics have been generated. Details of providing an optimum number of topics are provided in FIG. 2A.

In block B34, each topic is tagged using module 16. Details of tagging a topic are provided in FIG. 2B.

Figure 2A:
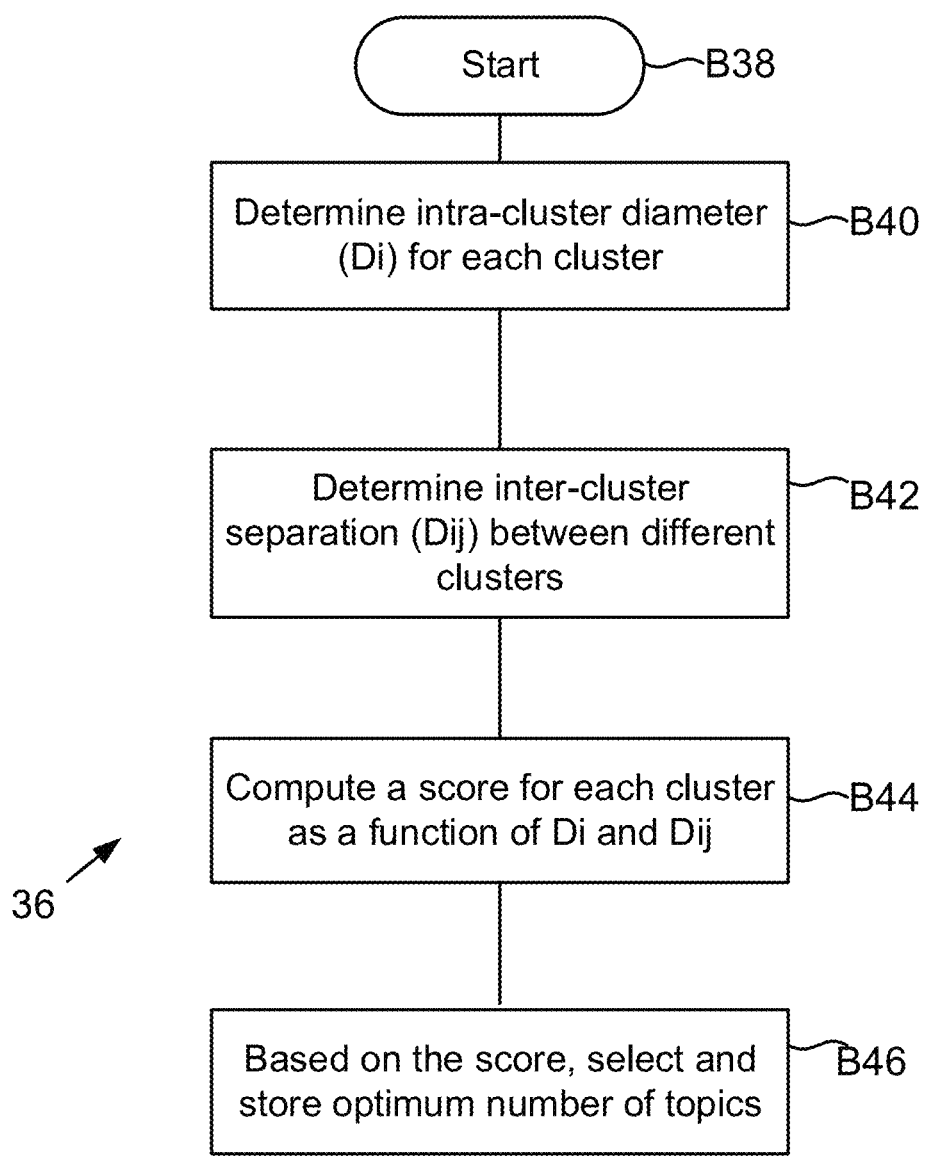
FIG. 2A shows an example of a process for selecting a topic for a document corpus, according to one aspect of the present disclosure.
Figure 2B:
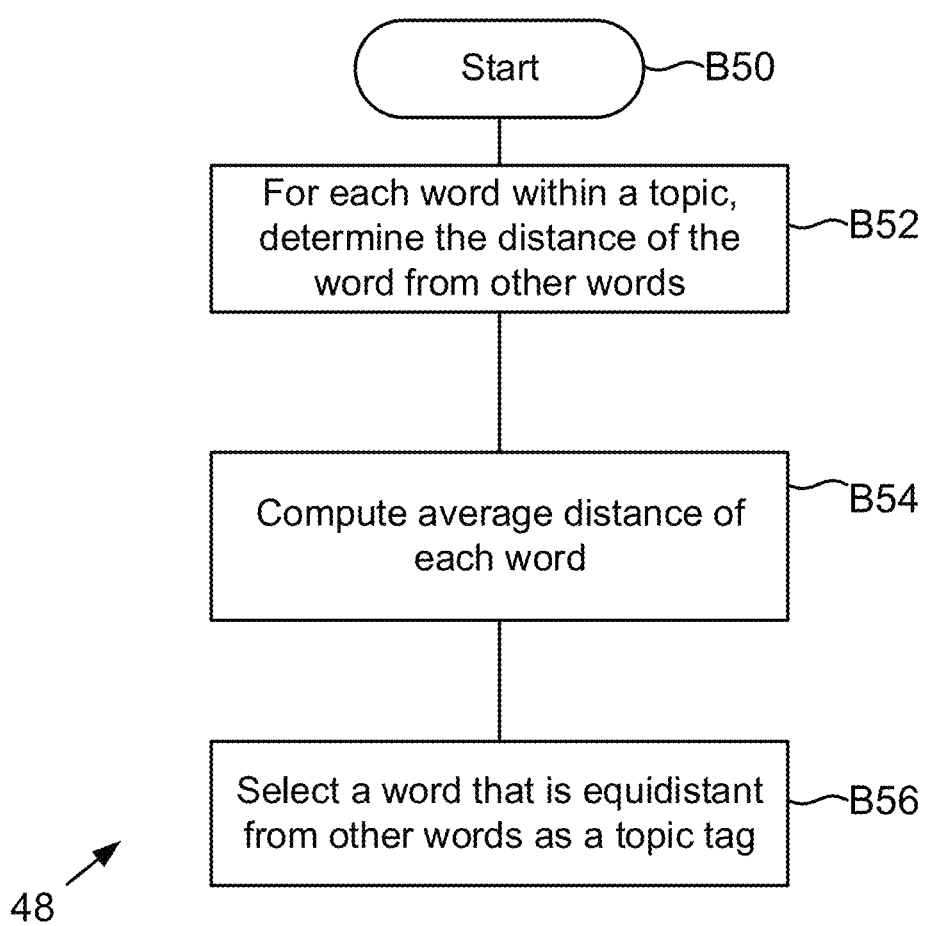
FIG. 2B shows an example of a process for assigning a tag for a topic, according to one aspect of the present disclosure.

FIG. 2A shows a process 36 for processing topics of a document corpus, according to one aspect of the present disclosure. The process blocks are executed by a processor executing instructions for modules 14 and 16.

To determine the optimum number of topics, module 14 starts with a first set of topics (or clusters). In block B40, the distance Di for each cluster is determined. In block B42, the inter-cluster (i.e. inter-topic) distance Dij is determined. A parameter that indicates the compactness of each topic is then computed as a function of Di and Dij, as described above. Based on the score, an optimum number of topics are determined. The topics are stored at the model structure 15 that is maintained by the core engine 21. Each topic is tagged using process 48 of FIG. 2B.

Process 48 begins in block B50. Process 48 blocks are executed by a processor implementing module 12 components. In block B52, the distance between each word of a topic is determined using the lexical module 16. The average distance for each word is computed in block B54. In block B56, a word that is substantially equidistant from the other words of the topic is selected as a tag. This information is stored in model structure 15, where each topic has an associated tag. The tag is an attribute of the topic.

Figure 3A:
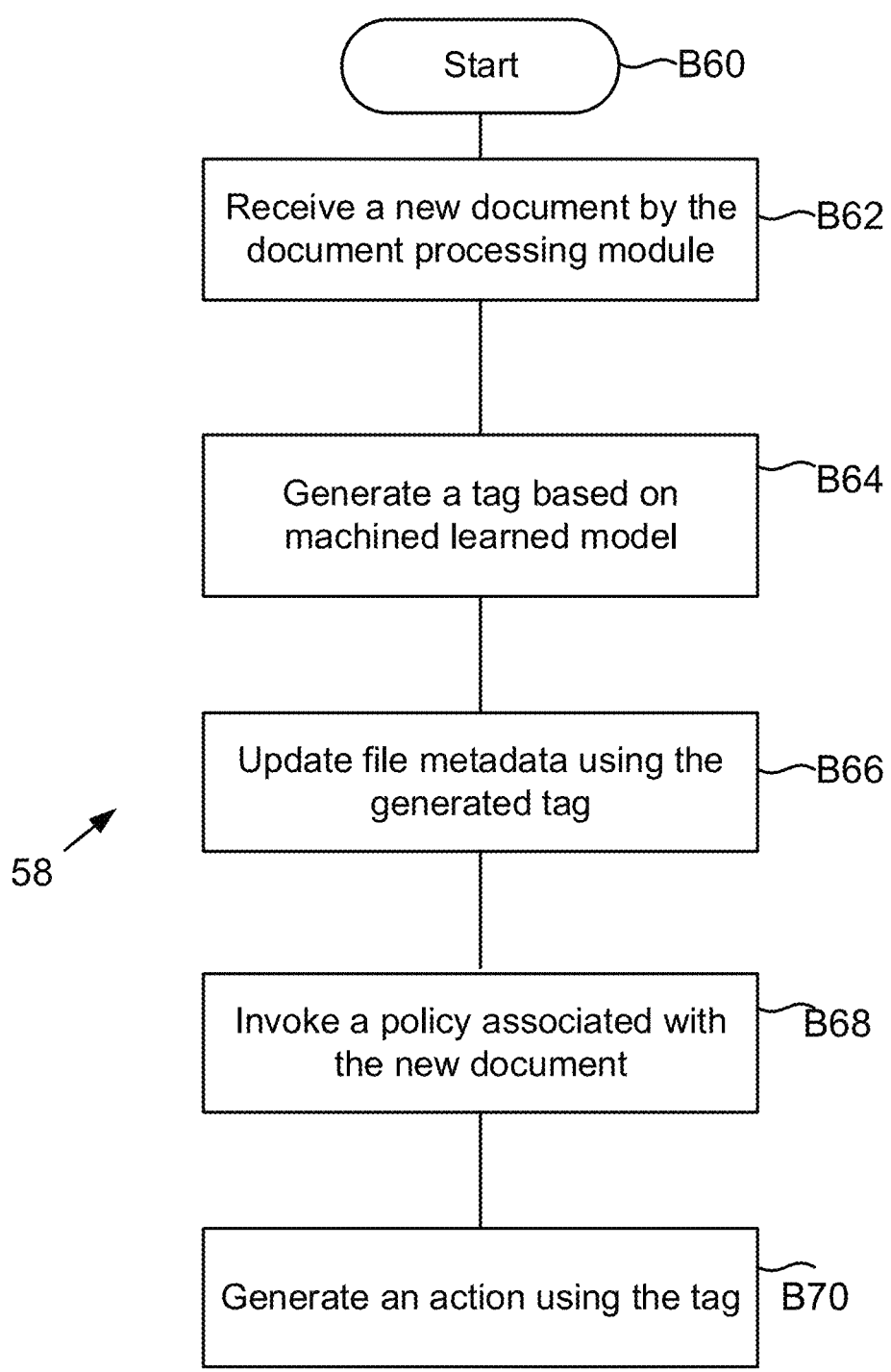
FIGS. 3A-3B show process flows for using the document classification system of the present disclosure.
Figure 3B:
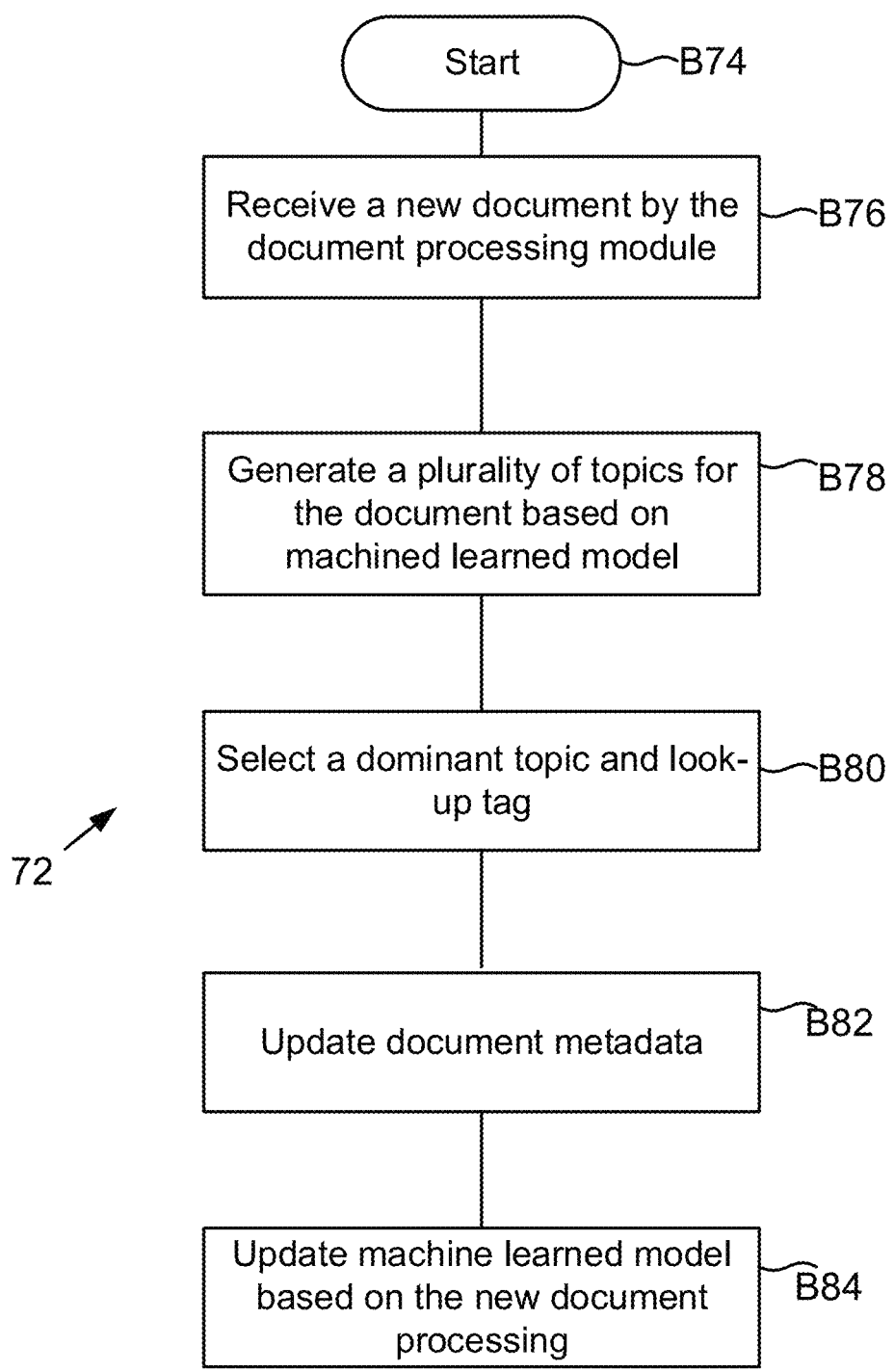

FIGS. 3A-3B show machine learned process flows for using and updating the model structure 15, according to one aspect of the present disclosure. Process 58 of FIG. 3A starts in block B60 after the model structure 15 has been developed and tested i.e. a list of tagged topics are stored in model structure 15.

A new document 22 is received by module 12 in block B62. The content of the document is extracted in block B64. A topic and a tag for the new document is generated. Based on the tag, metadata for the file is updated in block B66. In block B68, a policy associated with the document is invoked. The policy may be to limit access to information or any other policy type. In block B70, an action associated with the tag is generated. The action may be to generate an alert, relocate the document storage location or any other action type. The adaptive aspects of the present disclosure are not limited to any specific action type.

Process 72, a machine learning process for updating model data structure 15 is shown in FIG. 3B and starts in block B74. In block B76, a new document is received by module 12, for example, new document 22. In block B78, the content of the new document is extracted. The model structure 15 is used to generate a plurality of topics. A dominant topic i.e. the closest match for the new document is selected in block B80. The tag associated with the topic is retrieved. The document metadata is updated in block B82. Thereafter, in block B84, model 15 is updated based on the new document processing.

Figure 4A:
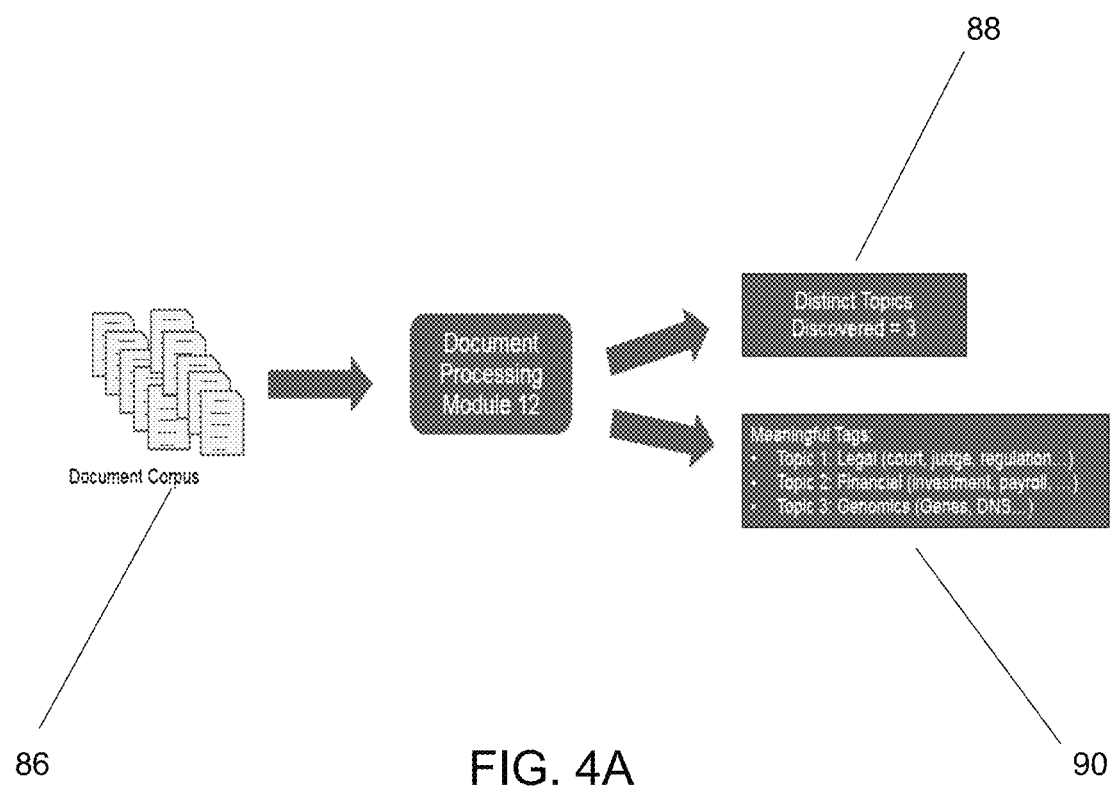
FIG. 4A shows an example of training a document classification model, according to one aspect of the present disclosure.

FIG. 4A shows a pictorial depiction of generating topics and tags for a document corpus. Documents 86 are fed into the module 12. An optimum number of topics 90 are generated with meaningful tags 92 using the processes of FIGS. 1D and 2A-2B.

Figure 4B:
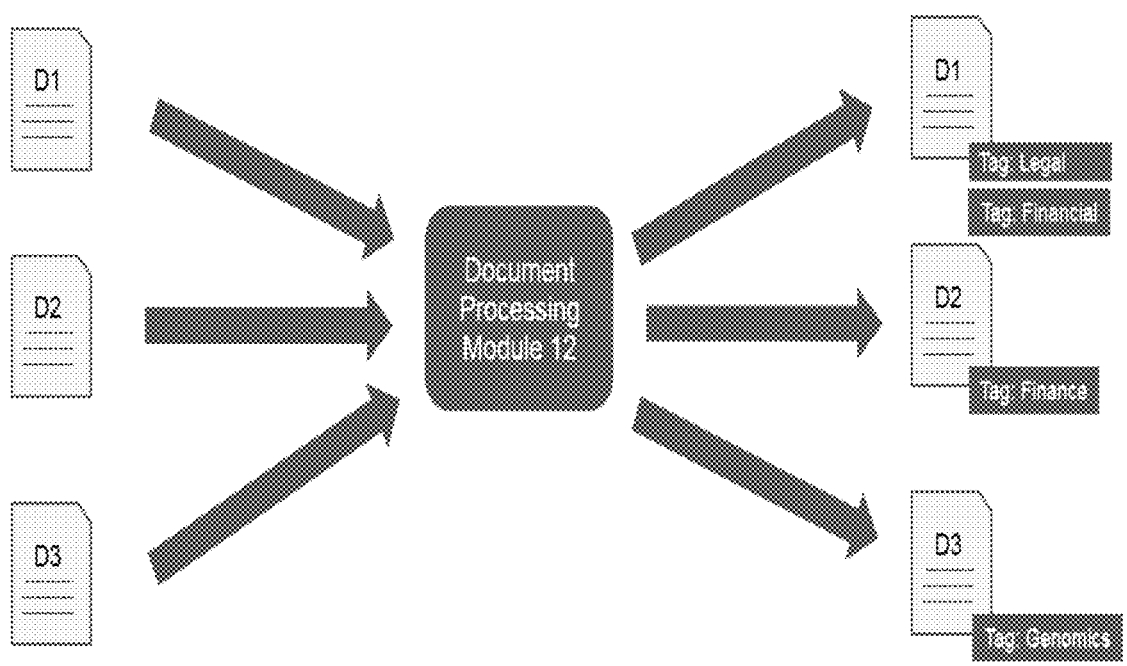
FIG. 4B shows an example of using the trained document classification model, according to one aspect of the present disclosure.

FIG. 4B shows an example of annotating new documents using module 12 described above. The documents are annotated using the processes of FIGS. 3A and 3B, respectively, described above in detail.

Figure 4C:
FIGS. 4C-4D show examples of a dashboard for viewing a data repository, according to one aspect of the present disclosure.

FIG. 4C shows a screen shot 94 that may be presented on a computing device, using the process flows of the present disclosure. The screen shot 94 shows a web-based interactive dashboard to enable users to get a high-level view of a data repository. The data catalogue of FIG. 4C is populated with content based tags, using the processes described above. For example, FIG. 4C shows that there are 101 files with their content distributions in a pie chart 96. Each high-level document class is sub-divided into sub-categories 98, e.g. a document related to "finance" may be in a "property-tax" or "home-expense" sub-categories. The classification into sub-categories is also automated and shown as a pie chart.

Figure 4D:
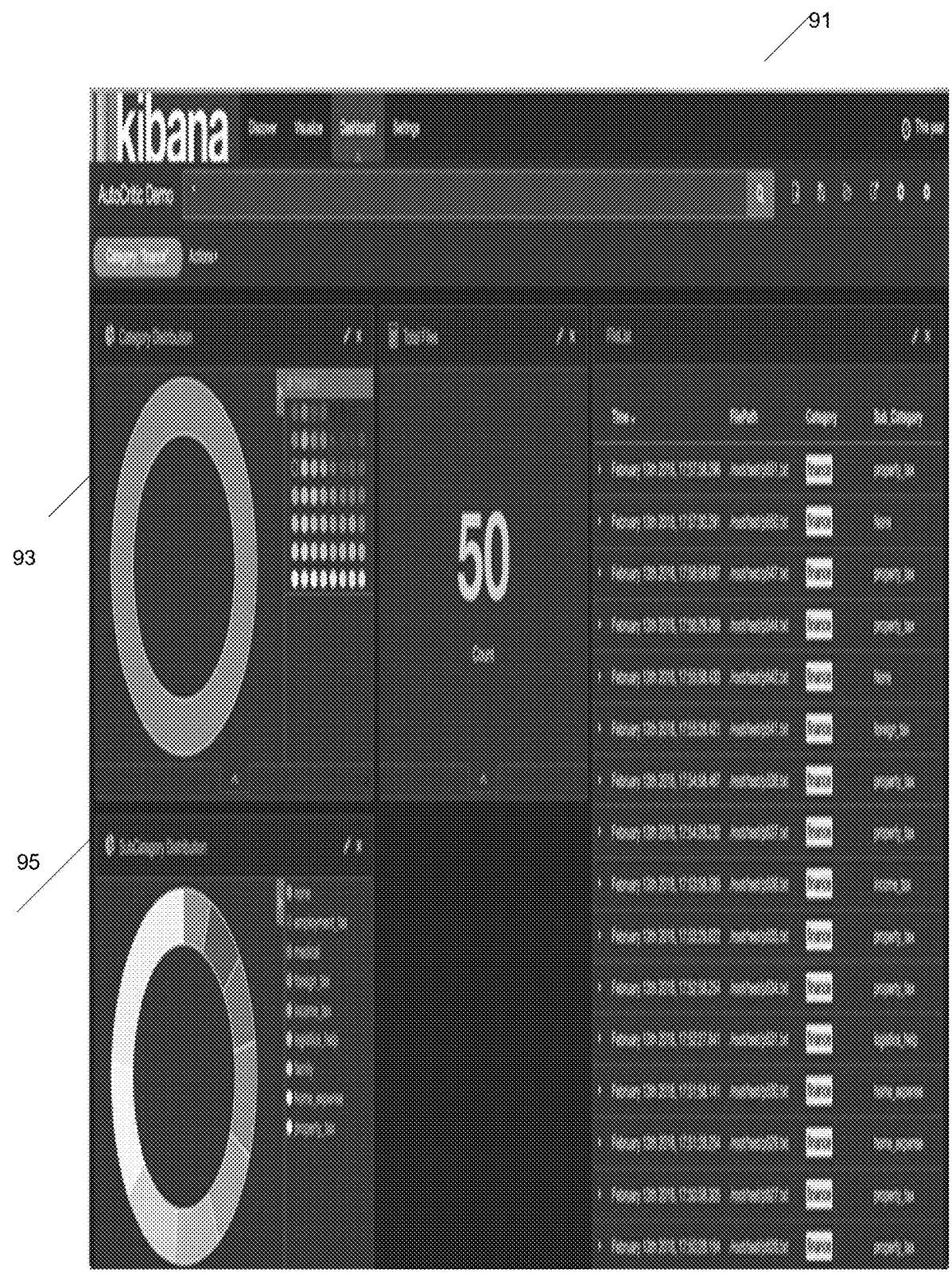

FIG. 4D shows a screenshot 91 illustrating a change to the screen shot of FIG. 4C, when a particular category is selected, in this example, "Finance". The category distribution (93) and the sub-category (95) provide a "drilled" down view of a document repository.

The dashboards of FIGS. 4C/4D enable a user to get a better understanding of their data repositories, without having to manually go through each document. This enables users to understand and dig deeper into existing complexities of unstructured electronic data of an enterprise. Knowing what data exists is a first step to effective governance. This view of the data could be of potential help to users in setting appropriate governance policies. For example, more stringent access permissions can be exercised for financial documents but less for the legal documents. Similarly, while tax related documents are retained in a higher performance tier for a month from the time of generation, the legal documents are moved into a capacity tier (lower level storage devices) a week after their generation (depending on access patterns) and thereby, optimizing operational expense.

An example of executing the process steps is further illustrated by Table 1 below. A movie review dataset with 2000 movie reviews were processed by classification module 23. Module 14 provided 5 to 50 topics. An optimum number of 10 topics was identified by the module 23 and process of FIG. 2A. Table 1 below lists the 10 topics along with the annotated tag. As can be seen, the topics are well separated from each other and include a set of related/similar words.

TABLE I

| TOPIC No. | Bag of Words | Annotated tag |
| --- | --- | --- |
| 1 | Comedy, funny, school, jokes, high, smith, humour, murphy, wild, laughs . . . | Humour |
| 2 | Film, story, life, character, man, world, time, films, young, performance . . . | Life |
| 3 | Batman, crime, wife, police, cop, Jackie, murder, pulp, harry, Arnold . . . | Case |
| 4 | Girls, sex, wedding, nights, Julia, vegas, musical, spice, big, rock . . . | Rock |
| 5 | Action, scream, killer Jackie, horror, chan, vampire, lee, films, hong . . . | Action |
| 6 | War, men, political, battle, American, army, ryan, Spielberg, private | White |
| 7 | Disney, family, animated, animation, voice, tarzan, toy, story, kids, Mulan . . . | King |
| 8 | Love, romantic, joe, titanic, woman, daughter, simon, tom, ryan, mother, relationship, romance . . . | Father |
| 9 | Movie, film, good, time, plot, bad, movies, make, characters, character . . . | Film |
| 10 | Effects, alien, star, special, planet, earth, ship, aliens, space, science . . . | Star |

In one aspect, methods and systems for document classification are provided. One method includes generating by a processor, a plurality of topics using content of a plurality of electronic documents, where each topic includes a plurality of words associated with the plurality of electronic documents; reducing by the processor, the plurality of topics to a subset of topics to represent the plurality of electronic documents based on a parameter indicating a property of each subset topic and separation between the subset topics; automatically generating by the processor, a tag for each subset topic, based on the tag's position within the subset topic; wherein each tag is an attribute of each subset topic; storing by the processor, the subset of topics with corresponding tags in a model data structure; and updating the model data structure by the processor based on one of a new topic and a new tag associated with an electronic document.

System 100: In one aspect, the document classification may be used in a networked storage system, especially for managing performance and other management related data that is collected for a data center, for example, latency, utilization, number of operations that are processed in a second (IOPS), or any other data. Typically, this data has to be analyzed and then stored appropriately. Governance policies for the collected data determine how the data is used and archived. The processes and systems described herein classify and tag the management data for a networked storage system.

Figure 5:
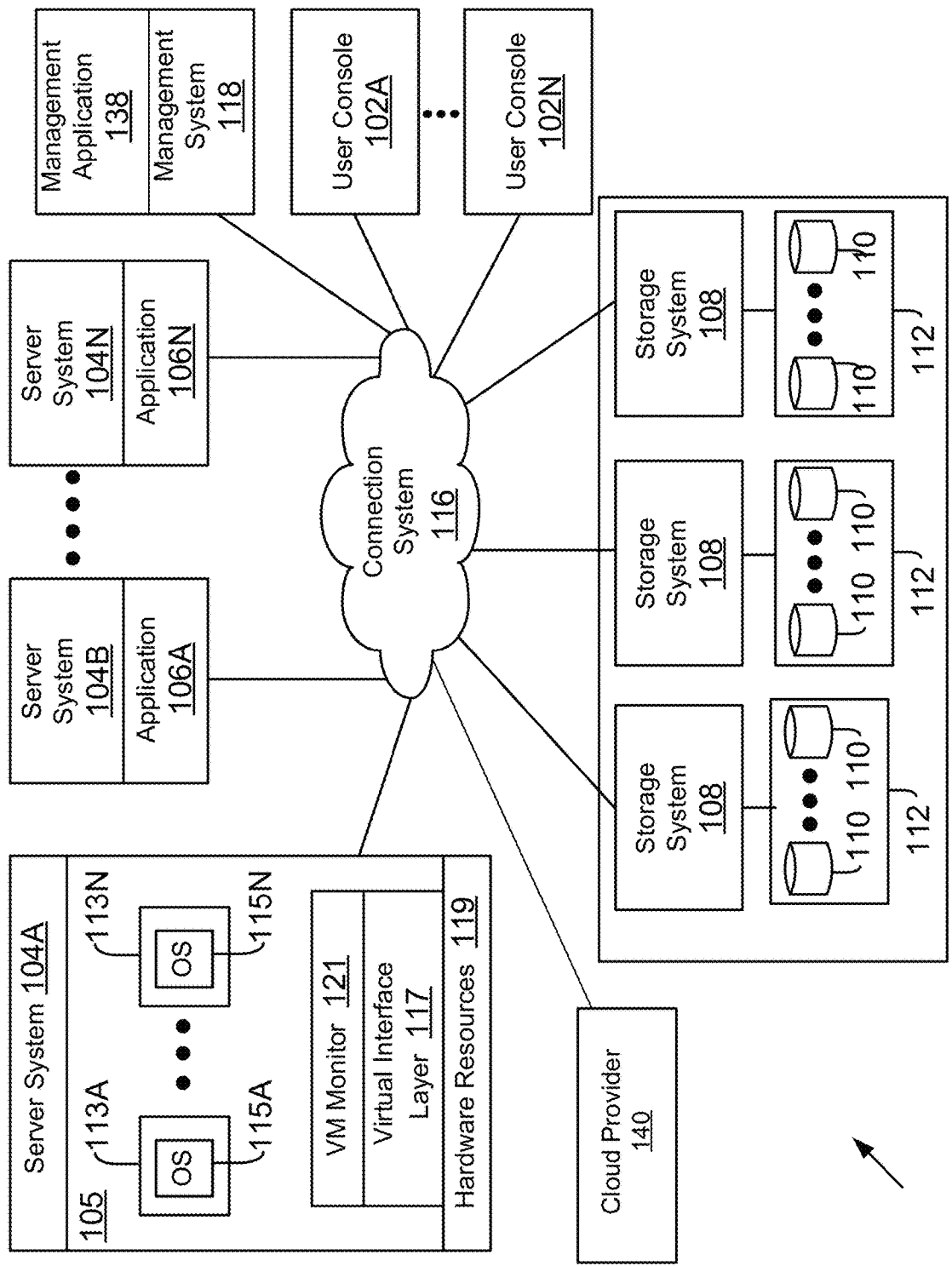
FIG. 5 shows an example of a networked storage environment for using document classification model, according to one aspect of the present disclosure.

FIG. 5 shows an example of a networked operating environment 100 (also referred to as system 100), for implementing the various adaptive aspects of the present disclosure. In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102). A cloud provider 140 may be used to provide storage to clients.

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program, an email program or any other computer executable program. Documents generated by the applications are classified by module 12 described above.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 105, according to one aspect. In the virtual machine environment 105, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 105 includes a plurality of VMs 113A-113N that execute a plurality of guest OS 115A-115N (may also be referred to as guest OS 115) to share hardware resources 119. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other virtualization layer type, presents and manages the plurality of guest OS 115. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by a separate stand-alone computing system, often referred to as a hypervisor server or VMM server and VMs 113A-113N are presented via another computer system. It is noteworthy that various vendors provide virtualization environments, for example, VMware Corporation, Microsoft Corporation (without derogation of any third party trademark rights) and others. The generic virtualization environment described above with respect to FIG. 5 may be customized depending on the virtual environment provider.

System 100 may also include a management system 118 for managing and configuring various elements of system 100. Management system 118 may include one or more computing systems for retrieving storage system 108 performance data and providing it to module 12 for classification. Management system 118 may also execute or include a management application 138 that processes performance data retrieved from the storage system 108. The management data is classified by module 12 and can be used to configure system 100 resources. This improves overall computing technology of system 100.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module. Briefly, the network module is used to communicate with server systems 104 and management system 118, while the storage module is used to communicate with the storage devices 110.

Figure 6:
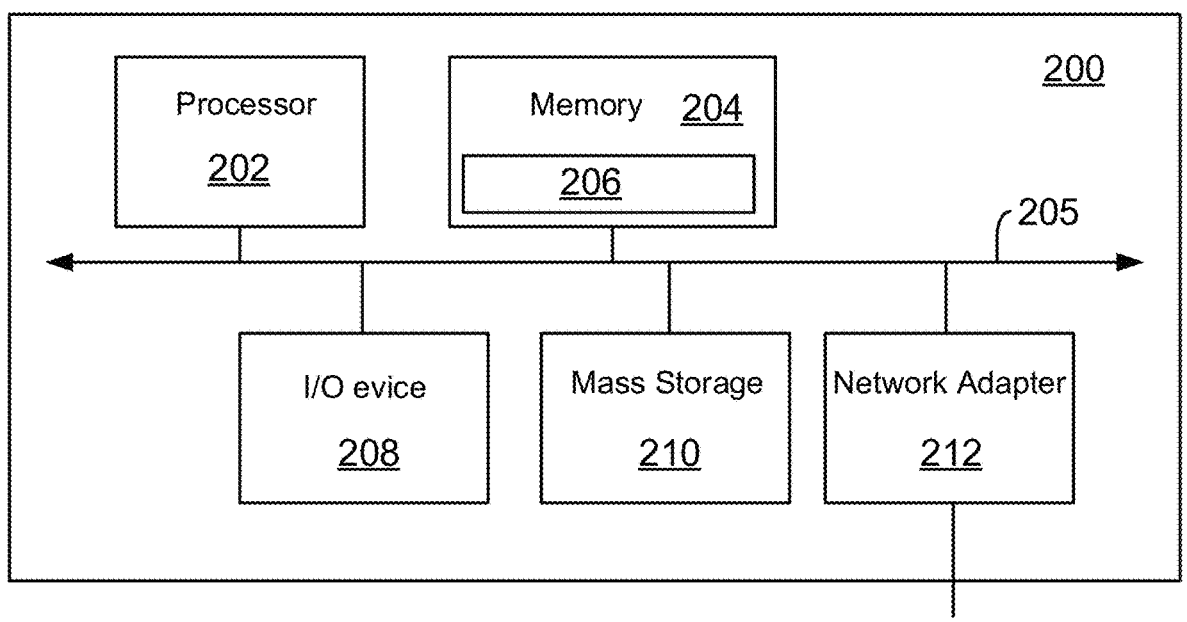
FIG. 6 shows an example of a processing system, used according to one aspect of the present disclosure.

Processing System: FIG. 6 is a high-level block diagram showing an example of the architecture of a processing system, at a high level, in which executable instructions as described above can be implemented. The processing system 200 can represent modules of management system 118, user console 102, server systems 104 and others. The processing system 200 may be used to execute module 12. Note that certain standard and well-known components which are not germane to the present invention are not shown in FIG. 6.

The processing system 200 includes one or more processors 202 and memory 204, coupled to a bus system 205. The bus system 205 shown in FIG. 6 is an abstraction that represents any one or more separate physical buses and/or point-to-point connections, connected by appropriate bridges, adapters and/or controllers. The bus system 205, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 202 are the central processing units (CPUs) of the processing system 200 and, thus, control its overall operation. In certain aspects, the processors 202 accomplish this by executing programmable instructions stored in memory 204. A processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 204 represents any form of random access memory (RAM), read-only memory (ROM), flash memory, or the like, or a combination of such devices. Memory 204 includes the main memory of the processing system 200. Instructions 206 which implements techniques introduced above may reside in and may be executed (by processors 202) from memory 204. For example, instructions 206 may include code for executing the process steps of FIGS. 1D, 2A-2B, and 3A-3B/4A-4C, respectively.

Also connected to the processors 202 through the bus system 205 are one or more internal mass storage devices 210, and a network adapter 212. Internal mass storage devices 210 may be or may include any conventional medium for storing large volumes of data in a non-volatile manner, such as one or more magnetic or optical based disks. The network adapter 212 provides the processing system 200 with the ability to communicate with remote devices (e.g., storage servers) over a network and may be, for example, an Ethernet adapter, a FC adapter, or the like. The processing system 200 also includes one or more input/output (I/O) devices 208 coupled to the bus system 205. The I/O devices 208 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services.

Thus, computing technology for document classification have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    generating, by a processor, a plurality of topics from content of a plurality of electronic documents, each topic includes a plurality of words associated with the plurality of electronic documents;
    determining, by the processor, a maximum distance between at least two words of each topic indicating compactness of each topic;
    determining, by the processor, an average distance between word pairs of at least two topics of the plurality of topics indicating separation between the plurality of topics;
    identifying, by the processor, a threshold score based on the maximum distance and the average distance;
    utilizing, by the processor, the threshold score to select a subset of topics from the plurality of topics to represent the plurality of electronic documents;
    automatically, generating by the processor, a tag for each subset topic, based on the tag's position within the subset topic; wherein each tag is an attribute of each subset topic;

storing, by the processor, the subset of topics with corresponding tags in a model data structure;
identifying, by the processor, a new topic and a new tag associated with a new electronic document; and
updating, by the processor, the model data structure based on the new topic and the new tag.

2. The method of claim 1, further comprising: receiving, by the processor, a number of desired topics for a document corpus comprising of the plurality of the plurality of electronic documents; and selecting, by the processor, a number of subset topics to match the number of desired topics, based on the threshold score.

3. The method of claim 2, further comprising: representing, by the processor, the document corpus within a dashboard for identifying the subset of topics and a tag associate with each subset topic.

4. The method of claim 1, further comprising: determining, by the processor, a centricity score of each subset topic, the centricity score representing a lexical distance of each word from other words of each subset topic; and selecting, by the processor, a word from each subset topic with a highest centricity score as the tag for each subset topic.

5. The method of claim 1, wherein the tag for each topic is generated using a lexical database.

6. The method of claim 1, further comprising: updating, by the processor, the model data structure after a certain duration, based on a number of new electronic documents generated after the plurality of electronic documents are processed.

7. The method of claim 1, further comprising: invoking, by the processor, a policy associated with the new electronic document; and initiating, by the processor, an action associated with the new tag, based on the invoked policy.

8. A non-transitory, machine readable storage medium having stored thereon instructions for performing a method, comprising machine executable code which when executed by at least one machine, causes the machine to:
generate a plurality of topics using content of a plurality of electronic documents, each topic includes a plurality of words associated with the plurality of electronic documents;
determine a maximum distance between at least two words of each topic indicating compactness of each topic;
determine an average distance between word pairs of at least two topics of the plurality of topics indicating separation between the plurality of topics;
identify a threshold score based on the maximum distance and the average distance;
utilize the threshold score to select a subset of topics from the plurality of topics to represent the plurality of electronic documents;
automatically generate a tag for each subset topic, based on the tag's position within the subset topic; wherein each tag is an attribute of each subset topic;
store the subset of topics with corresponding tags in a model data structure;
identify a new topic and a new tag associated with a new electronic document; and
update the model data structure based on the new topic and the new tag.

9. The storage medium of claim 8, wherein the machine executable code further causes the machine to: receive a number of desired topics for a document corpus comprising of the plurality of the plurality of electronic documents; and select a number of subset topics to match the number of desired topics, based on the threshold score.

10. The storage medium of claim 9, wherein the machine executable code further causes the machine to: represent the document corpus within a dashboard for identifying the subset of topics and a tag associate with each subset topic.

11. The storage medium of claim 8, wherein the machine executable code further causes the machine to: determine a centricity score of each subset topic, the centricity score representing a lexical distance of each word from other words of each subset topic; and select a word from each subset topic with a highest centricity score as the tag for each subset topic.

12. The storage medium of claim 8, wherein the tag for each topic is generated using a lexical database.

13. The storage medium of claim 8, wherein the machine executable code further causes the machine to: update the model data structure after a certain duration, based on a number of new electronic documents generated after the plurality of electronic documents are processed.

14. The storage medium of claim 8, wherein the machine executable code further causes the machine to: invoke a policy associated with the new electronic document; and initiate an action associated with the new tag, based on the invoked policy.

15. A system comprising:
a memory containing machine readable medium comprising machine executable code having stored thereon instructions; and a processor module coupled to the memory, the processor module configured to execute the machine executable code to:
generate a plurality of topics using content of a plurality of electronic documents, each topic includes a plurality of words associated with the plurality of electronic documents;
determine a maximum distance between at least two words of each topic indicating compactness of each topic;
determine an average distance between word pairs of at least two topics of the plurality of topics indicating separation between the plurality of topics;
identify a threshold score based on the maximum distance and the average distance;
utilize the threshold score to select a subset of topics from the plurality of topics to represent the plurality of electronic documents;
automatically generate a tag for each subset topic, based on the tag's position within the subset topic; wherein each tag is an attribute of each subset topic;
store the subset of topics with corresponding tags in a model data structure;
identify a new topic and a new tag associated with a new electronic document; and
update the model data structure based on the new topic and the new tag.

16. The system of claim 15, wherein the machine executable code further causes to: receive a number of desired topics for a document corpus comprising of the plurality of the plurality of electronic documents; and select a number of subset topics to match the number of desired topics, based on the threshold score.

17. The system of claim 16, wherein the machine executable code further causes to: represent the document corpus within a dashboard for identifying the subset of topics and a tag associate with each subset topic.

18. The system of claim 15, wherein the machine executable code further causes to: determine a centricity score of each subset topic, the centricity score representing a lexical distance of each word from other words of each subset topic;

and select a word from each subset topic with a highest centricity score as the tag for each subset topic.

19. The system of claim 15, wherein the tag for each topic is generated using a lexical database.

20. The system of claim 15, wherein the machine executable code further causes to: invoke a policy associated with the new electronic document; and initiate an action associated with the new tag, based on the invoked policy.

\* \* \* \* \*